United States Patent

[11] 3,572,898

[72] Inventor Charles Cecil Eaglesfield
 Harlow, Essex, England
[21] Appl. No. 751,910
[22] Filed Aug. 12, 1968
[45] Patented Mar. 30, 1971
[73] Assignee International Standard Electric Corporation
 New York, N.Y.
[32] Priority Oct. 12, 1967
[33] Great Britain
[31] 46,532/67

[54] Z-CUT CRYSTAL ELECTRO-OPTICAL MODULATOR
 7 Claims, 5 Drawing Figs.

[52] U.S. Cl. .................................................... 350/160
[51] Int. Cl. ..................................................... G02f 1/24
[50] Field of Search ......................................... 350/150, 157, 160, 161

[56] References Cited
UNITED STATES PATENTS
3,407,017 10/1968 Fleisher et al. ............... 350/160

Primary Examiner—William L. Sikes
Attorneys—C. Cornell Remsen, Jr., Walter J. Baum, Percy P. Lantzy, Philip M. Bolton, Isidore Togut and Charles L. Johnson, Jr.

ABSTRACT: A plurality of Z-cut KDP-type crystal optical modulators, each having a fast axis and a retard axis associated therewith, are arranged in a stack so as to require a potential lower than that required for modulation utilizing a single crystal. Each crystal is formed with an annular recess around a center island on the upper and lower surface and recessed tails extending, in orthogonal relationship one to the other, from each annular recess. The crystals are stacked with alternate plates similarly aligned and adjacent plates oppositely aligned with respect to their fast and retard axes. A conductor is connected between each annular recess and one of two terminals of a source of potential in such manner that the effect of successive plates is additive.

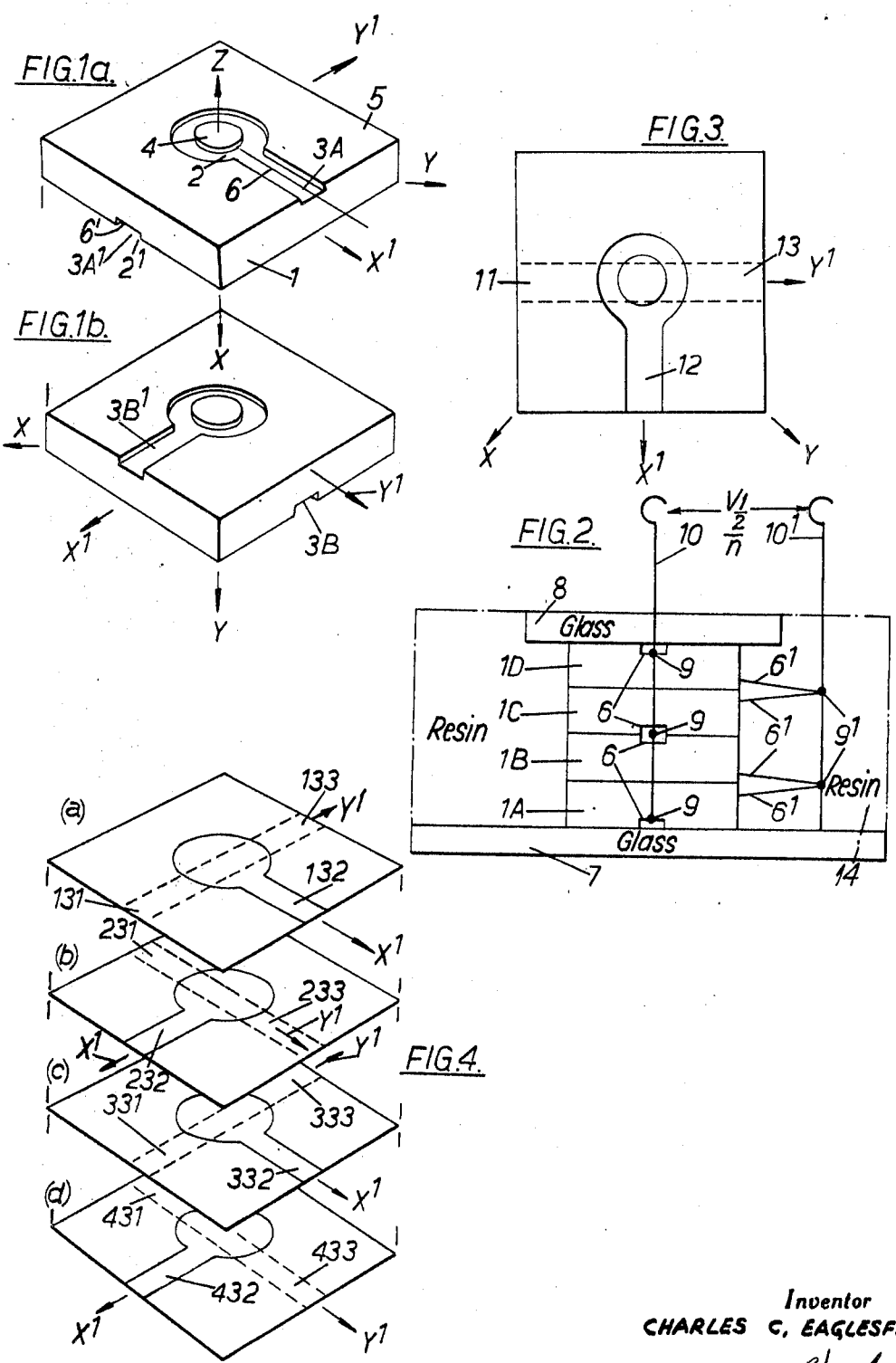

3,572,898

Z-CUT CRYSTAL ELECTRO-OPTICAL MODULATOR

BACKGROUND OF THE INVENTION

The present invention relates to electro-optical modulators and has particular though not exclusive application to modulators which contain as operating elements Z-cut plates of KDP-ADP type crystals.

The KDP-ADP type crystals are KDP itself ($KH_2PO_4$) and its isomorphs DKDP ($KD_2PO_4$, D here meaning deuterium), KDA ($KH_2A_sO_4$), RDA ($RbH_2A_sO_4$) and ADP ($NH_4H_2PO_4$).

KDP-ADP type crystals all belong to the piezo-electric point group 42m at room temperature.

A Z-cut plate of KDP-ADP type crystal is a plate cut so that its major surface lies in the plane formed by the X AND Y axes of the crystal, the X, Y and Z axes being crystallographically distinguished. The X, Y and Z axes of the original crystal form an orthogonal system. In KDP-ADP type crystals there are further physically distinguished axes X' and Y' at 45° to the X and Y axes and lying in the plane formed by the X and Y axes. The X', Y' and Z axes form another orthogonal system, the X' and Y' axes lying on the major surface of a Z-cut crystal and the Z axis being normal to the major surface.

When such a plate is used as a modulator, then the direction along which the light beam should be directed and the direction in which the electric field should be applied coincide with the Z-axis. The action of an applied electric field is to cause a retardation of light which is polarized along say the retard or X' axis compared with light which is polarized along the fast or Y' axis. Without a field a Z-cut KDP plate transmits both polarizations equally; the plate is fully modulated when the field is at a value such that the retardation is one half-period of the vibration of light of a given frequency, the plate then being referred to as a halfwave plate and the voltage being the halfwave voltage denoted $V_{1/2}$. Note that by the application of $V_{1/2}$ the polarization of the output light is switched so that it is at right angles to the input polarization. Voltages between 0 and $V_{1/2}$ give transmissions between zero and unity.

SUMMARY OF THE INVENTION

According to the invention there is provided an electro-optical modulator which includes a plurality of plates of a material which exhibits an electro-optical effect, each plate having first and second major surfaces and fast and retard axes in orthogonal relationship, said plates stacked so that alternate plates are similarly aligned and adjacent plates oppositely aligned with respect to their fast and retard axes so that the electro-optical effects of the plates are additive, a first conductor connected to said first major surface, a second conductor connected to said second major surface, means for connecting the first conductor of alternate plates and the second conductor of the plates adjacent to said alternate plates to a first terminal, and means for connecting the second conductor of said alternate plates and the first conductor of adjacent plates to a second terminal.

The above mentioned and other features of the invention will become more apparent and the invention itself will best be understood by reference to the following description, taken in conjunction with the accompanying drawings, in which:

BRIEF DESCRIPTION OF THE DRAWINGS

FIG. 1a is a perspective view of a component for use in a modulator, the component being fabricated from a crystal of KDP;

FIG. b is a perspective view of a component which is a mirror image of the component of FIG. 1a;

FIG. 2 is a side elevation of a stack of such components having terminal leads attached thereto and end cover plates and arranged to form an electro-optical modulator;

FIG. 3 is a plan view of a modified component; and

FIG. 4 is a diagrammatic perspective view of a stack of the components of FIG. 3.

For convenience the description is given in terms of KDP. The invention may however be realized using plates of other material, in particular using plates of an isomorph of KDP.

DESCRIPTION OF THE PREFERRED EMBODIMENT

FIG. 1a shows in perspective a Z-cut plate of KDP the body of which is designated 1 and the major surface of which is square. The X and Y axes of the original crystal form the diagonals of the square and the Z axis is perpendicular to the surface. An annular recess 2 with tail 3A is formed in the upper surface by ultra-sonic machining or by air-abrasion, while the central portion 4 and the outer portion 5 have been masked with adhesive tape so as to be protected from abrasion.

A correspondingly located annular recess 2' with tail 3A' is formed on the lower surface so that the unabraded central portion on the lower surface is directly below the central portion 4 on the upper surface. The tail 3A' on the lower surface runs at right angles to the tail 3 on the upper surface. The upper and lower faces are polished using a suspension of alumina in alcohol, particular attention being given to the central portions. The recesses 2 and 2' are then silvered using a colloidal suspension of silver paint and making sure that the level of the silver does not exceed the surface level. At the same time, wires 6, 6' are embedded in the silver, being maintained below the level of the surface and being led along the tails so as to protrude some distance from the component 1.

Annular electrodes are just one particular form of apertured electrode which allow a light beam to pass through a central portion. (Indeed semitransparent electrodes with no aperture do not block off the light beam, however annular electrodes are a convenient means of modulating the narrow beam from a laser.)

The usual operating voltage across a plate used as a modulator can be reduced by making a stack of plates, each with the same voltage across it and arranged so that the effects of successive plates are additive.

If the individual plates are stacked without relative rotation, then for the optical effects to be additive, the electrical fields must all be in the same direction along the Z axis. If the fields are applied by the same 2-terminal source, then the adjacent faces of successive plates in the stack are of opposite electrical polarity, and the electrodes on them must be insulated from each other.

The insulation can consist, for instance, of a sheet of glass between successive plates. However, not only does this increase the overall thickness and complication of the device, but it increases the number of surfaces through which the light must pass, each of which (unless appropriate steps are taken) causes an unwanted reflection and transmission loss.

The insulation requirement is removed by rotating successive plates of the stack by 90°. Then, for the optical effects to additive, the direction of the field needs to be reversed in each plate. This means that the adjacent electrodes of two successive plates are now of the same polarity and may be electrically connected.

The component shown in FIG. 1a is right-handed in the sense that a right-handed upward turn is required in order to rotate from the direction of the tail (3A') on the lower surface to that of the tail (3A) on the upper surface. The component shown in FIG. 1b is a mirror image of the component of FIG. 1a, and is left-handed since to rotate from the direction of the tail on the lower surface (3B) into the direction of the tail on the upper surface (3B') requires a left-handed upward turn.

FIG. 2 shows a method of appropriately connecting elements on adjacent faces of successive plates, the method including the steps of alternating right-handed plates 1A, 1C with left-handed plates 1B, 1D and making the tails of successive plates adjacent. The fast axes of alternate plates are in alignment with one another, and the retard axes of alternate plates are in alignment with one another.

The central portions of adjacent plates are brought into optical contact by cementing together the adjacent faces using a transparent optical cement (e.g. Canada Balsam, but keeping the temperature below 80° C.) or using a cold setting resin. The stack is mounted on a glass slide 7 and is topped by a smaller glass slide 8, the slides being cemented to the stack with resin as described. Care is taken that no air bubbles occur at the central window. The wires 6, 6' are soldered at 9, 9' to terminals 10, 10' and the assembly encapsulated in embedding resin 14, the terminals 10, 10' protruding therefrom. The side faces as well as the major faces are thus protected from the atmosphere. Also the electrical insulation is improved. The slide 8 is smaller than the slide 7 to facilitate pouring the embedding resin.

Instead of the high value of halfwave voltage normally required, e.g. about 8 KV for KDP and about 3 KV for DKDP, the voltage now required between the terminals 10 and 10' is $V_{1/2}/n$, where $n$ is the number of plates in the stack.

The plates 1A to 1D in the stack of FIG. 2 are arranged so that like axes of alternate plates are parallel and in the same direction.

FIG. 3 shows an "ambidextrous" plate which combines the left-handed and right-hand features of the plates of FIGS. 1a and b. The diagonals of a square Z cut plate of KDP coincide with the X and Y crystal axes. Annular electrodes are formed on the upper and lower surfaces of the plate, tails 11 and 13 on the lower surface being parallel to the fast axis and a tail 12 on the upper surface being parallel and in the direction of the retard axis.

FIG. 4 shows a stack of plates similar to the one in FIG. 3, tails 131, 231, 331 and 431 corresponding to tail 11 of FIG. 3, tails 132, 232, 332 and 432 corresponding to tail 12 and tails 133, 233, 333 and 433 corresponding to tail 13. Alternate plates are rotated through 90° so that like axes of alternate plates are similarly aligned. The plates in FIG. 4 a—d are not skew versions of one another, but are constructed so as to be mechanically identical. As there are more than three plates in the stack, like axes of alternate plates are in alignment. (For example the X' axis 232 and the Y' axis 233 of plate b are in alignment respectively with the X' axis 432 and the Y' axis 433 of plate d. If the stack contained only three plates, consisting say of FIG. 4 a—c only, then there would be no plate which could be said to be an alternate plate to plate b. However like axes of the pair of alternate plates a and c would still be in alignment in this case.

It is convenient, but not strictly necessary, that the plates be square, with the X and Y crystal axes coinciding with the diagonals of the square. It is however necessary that all the plates in the stack be suitably oriented, which is conveniently done by cutting the plates from a larger slab. (If this is done and the electrodes and tails are inset as shown, then the square plates can be jumbled or inverted, correct orientation being automatic when the plates are stacked with adjacent tails together and with alternate pairs of plates at right angles).

Further optical elements e.g. linear polarizers or a quarterwave plate can if desired be included within the stack. These can conveniently be placed between a glass slide and the next unit. Such inclusions make more compact devices but a compromise must be made between compactness and versatility.

Since the input light must always be polarized, there is no objection to including a linear polarizer at one end, say between 1A and 7. (If the incident light is already polarized, the direction must be arranged parallel to the linear polarizer.) If the X and Y axes are at 45° to the edges of the plate, then the axes of the linear polarizer are in alignment with the X and Y axes of the plate.

It will be generally be easier to provide voltages $$\pm \frac{V_{1/2}}{2n} \text{ than } 0 \text{ and } \frac{V_{1/2}}{n}:$$

hence there seems little objection to including a quarterwave plate. This must be placed after the linear polarizer (in the direction of light travel) in any convenient position in the stack. The axes of the quarterwave plate should be parallel to the X' and Y' axes of the crystals.

A second crossed linear polarizer can be included within the stack, but if this is done the device is suitable only as an intensity modulator and cannot be used as a beam shifter. The second polarizer may then generally be omitted from the stack. The device is then suitable as a beam shifter. If it is required to use the device as an intensity modulator, then either an external polarizer can be used, or, by the use of a polarized laser source in conjunction with a device having a single built-in polarizer, the direction of the light through the device can be reversed.

Note that $V_{1/2}$ switches the polarization of the output light so that it is at right angles to the input polarization. This switching of polarization may be used to cause deflection of the beam if the second polarizer is replaced by a device like a Wollaston prism, in which the two polarizations take different paths.

The radial width of the electrodes should be made as small as possible so as to minimize their contribution to the capacitance.

The overall dimensions of the plate, and in particular the diameter of the center portion should be small for reasons of economy. A diameter should be selected which is adequate for beams of the width most usually encountered from optical sources, remembering that the field on the central axis will tend to fall off, requiring greater voltages and giving rise to impaired operation, if the diameter of the central portion is greater than the thickness of the plate.

The outer portion 5 adds to the capacitance, and its area should therefore be kept small, however its presence facilitates alignment of the plates, making it relatively simple to maintain uniform X and Y axes throughout the stack and to line up the central optical window portions. In the fabrication of the assembly care must be taken not to damage the plates by excessive heat or moisture.

If electrode tails protrude from three or four faces of the stack (as would happen if, for example, right-handed plates only were used) the tails can be connected to the appropriate one of the pair of terminal leads by connector wires which partially encircle the stack. This is perhaps less convenient than the arrangement illustrated wherein the leads are straight and there are no encircling wires.

I claim:

1. An electro-optical modulator comprising:
   a plurality of plates of a material which exhibits an electro-optical effect;
   a first and a second major surface associated with each plate;
   a fast axis and a retard axis in orthogonal relationship associated with each of said plurality of plates;
   means for stacking said plurality of plates so that alternate plates are similarly aligned and adjacent plates oppositely aligned with respect to their fast and retard axes, so that the electro-optical effects of the plates are additive;
   a first conductor connected to said first major surface and a second conductor connected to said second major surface;
   a first and second terminal;
   means connecting the first conductor of alternate plates and the second conductor of the plates adjacent to said alternate plates to said first terminal; and
   means for connecting the second conductor of said alternate plates and the first conductor of adjacent plates to said second terminal.

2. An electro-optical modulator according to claim 1 wherein an annular recess and a recessed tail are provided on each of said major surfaces.

3. An electro-optical modulator according to claim 2 wherein said conductors are set in said annular recesses.

4. An electro-optical modulator according to claim 2 wherein said recessed tail extends across the width of said plate.

5. An electro-optical modulator according to claim 1 wherein adjacent surfaces of said plates are cemented into optical contact.

6. An electro-optical modulator according to claim 1 wherein said plurality of plates are constructed so as to be identical one with another.

7. An electro-optical modulator according to claim 1 wherein said material is a crystal of the class which includes KDP-ADP type crystals and their isomorphs.